3,299,325
CAPACITOR WITH REDUCIBLE SOLID OXIDE ELECTROLYTE DERIVED FROM HIGH CONCENTRATE SOLUTION AND METHOD FOR MAKING SAME

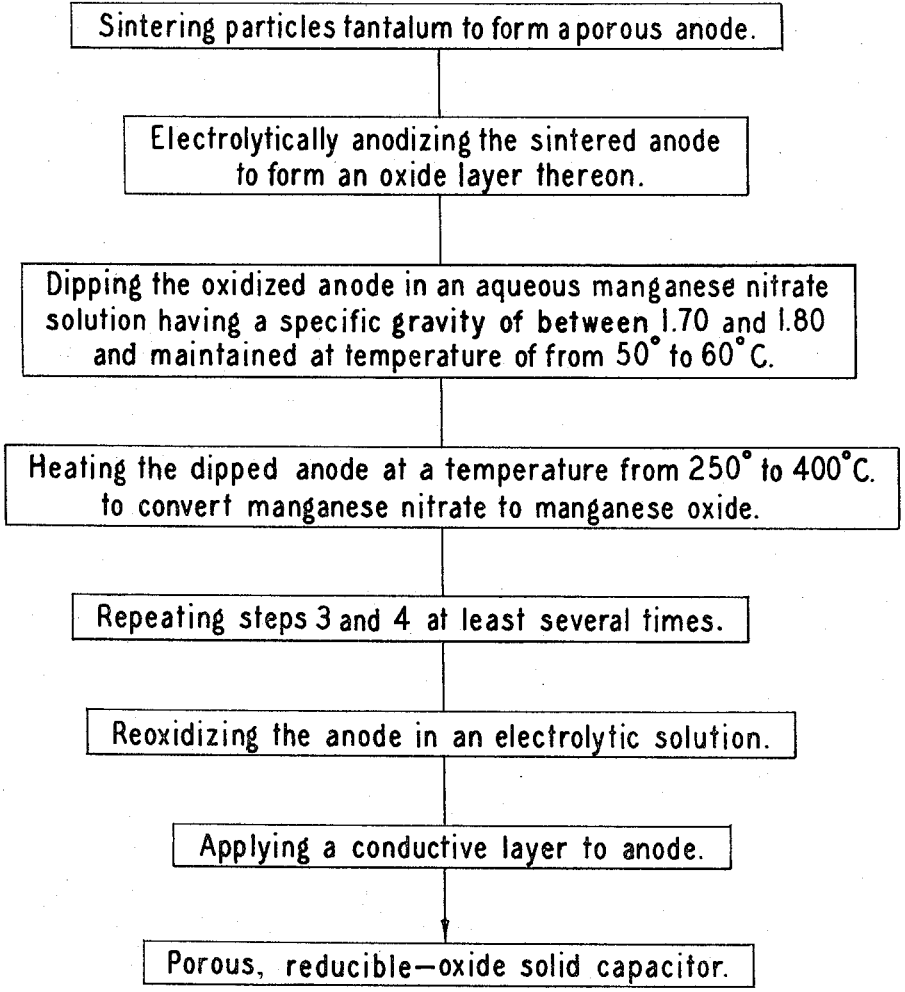

Johann S. Wagener and Roger J. Raschiotto, Cleveland, Ohio, assignors to Union Carbide Corporation, a corporation of New York
Filed Jan. 29, 1963, Ser. No. 254,591
5 Claims. (Cl. 317—230)

This invention relates to a capacitor having a solid or dry electrolyte. More particularly, it relates to a solid or dry electrolyte capacitor having improved dissipation factor and to an improved process for making such capacitor employing high concentration manganese nitrate solution at elevated temperature.

Solid electrolyte capacitors are known in the art. They are generally prepared by sintering particles of a metal capable of forming an oxide surface film thereon, such as tantalum, aluminum, tungsten, columbium, hafnium, titanium and zirconium, to form a porous metal anode. Tantalum is the preferred metal. This anode is then coated with an oxide layer in an electrolytic process. The resulting anode oxide layer forms the dielectric between the anode and a subsequently applied cathode. The successful operation of the resulting capacitor depends upon the quality of this anode oxide layer. In order to improve the quality of the anode oxide layer, the oxidized porous metal anode is dipped in a saturated manganese nitrate solution (specific gravity 1.62–1.64) at room temperature. The so-treated anode is then removed from the manganese nitrate solution and placed in an oven where it is heated to a high temperature (about 250–400° C.) to convert the manganese nitrate to a semiconducting manganese oxide. The dipping and heating steps are generally repeated several times in order to provide as complete as possible filling of the pores of the porous anode with manganese oxide. The anode is finally oxidized again in an electrolytic process to carry out the "healing" operation on the previously formed anode oxide layer. The healing operation is accomplished by electrolytically reoxidizing the anode. During this process, only the manganese oxide in and around any defects in the anode oxide layer is further converted to other more insulating forms of manganese oxide. This converted manganese oxide helps reduce direct current leakage through any defects in the anode oxide dielectric layer. The remaining portion of the manganese oxide acts as the dry electrolyte for the capacitor. The cathode is then prepared by applying a conductive layer to the processed anode. Preferably, a graphite layer is applied to the oxidized anode before the cathode layer is applied. The capacitor is completed by attaching leads to the anode and cathode and sealing the components inside a suitable case.

It has been found that while the capacitors prepared by the above described process are generally satisfactory for most electronic applications, some uses are not satisfactory because of high dissipation factor of the capacitor. The dissipation factor of a capacitor is a function of the ratio of dissipated energy in the capacitor to the stored energy in the capacitor. It is in effect a measure of the energy dissipated in an equivalent series resistance and is desirably low. When an alternating field is applied across a capacitor, the nature of the capacitor dielectric gives rise to a displacement current within the dielectric which leads the field variation by a 90° phase angle if it is a perfect dielectric and all the applied field energy is stored in the capacitor. If any energy is dissipated in the dielectric, the phase angle is reduced below 90° C. The dissipation factor is measured as the cotangent of the above mentioned phase angle and is generally expressed as 100×cotangent of the phase angle or "percent." For many electronic applications, and in particular for military use, solid electrolyte tantalum capacitors must meet the specifications of 6% maximum dissipation factor at 25° C. and 120 cycles per second test signal and 8% maximum dissipation factor at −55° C. and 120 cycles per second test signal. Prior art capacitors could not consistently meet such specifications.

It is an object of the present invention to provide a solid electrolyte capacitor having reduced dissipation factor.

It is a further object of the present invention to provide an improved process for making a solid electrolyte capacitor having reduced dissipation factor.

In accordance with the present invention, an oxidized porous metal anode prepared by known techniques is dipped in a high concentration solution of manganese nitrate at an elevated temperature and then removed from the manganese nitrate solution and placed in an oven where it is heated to a substantially higher temperature to convert the manganese nitrate to manganese oxide. The high concentration solution of manganese nitrate has a specific gravity of greater than 1.70 and preferably has a specific gravity of 1.75 to 1.80. The high concentration solution is maintained at a temperature of at least 50° C. and preferably about 50–60° C. The oxidized anode is dipped in the hot high concentration solution of manganese nitrate and heated to a substantially higher temperature (about 250–400° C.) several times in a manner similar to prior art procedures. Subsequent processing to complete the fabrication of the capacitor also employs prior art techniques. The resulting novel capacitor meets all specifications for performance including low dissipation factor.

The drawing is a diagrammatic illustration of the method of this invention.

The hot concentrated manganese nitrate solution employed in the process of the present invention is conveniently obtained by heating under reduced pressure a commercially available saturated manganese nitrate solution having a specific gravity of 1.62–1.64 to at least 50° C. to drive off at least some of the water of crystallization of the manganese nitrate. Atmospheric pressure evaporation can be used, but reduced pressure increases the evaporation rate. As the water of crystallization is evaporated, the solution becomes more concentrated in manganese nitrate and the specific gravity increases up to the desired values. The resulting concentrated solution must be maintained at a temperature of at least 30° C. or it will solidify. This solid manganese nitrate is hydroscopic and if exposed to the atmosphere will soon regain the moisture previously driven off, resulting in a lower concentration solution of manganese nitrate.

While we do not wish to be limited by a theoretical explanation, it is believed that the hot high concentration solution of manganese nitrate when converted by heating to the semiconducting manganese oxide substantially fills the pores of the porous metal anode with the conducting oxide and provides a greater degree of electrical conduction than previously attained. It thus reduces the series electrical resistance of the capacitor and reduces the dissipation factor.

In corporation of the present process improvement in existing capacitor production processes involves a minimum of difficulty since the viscosity of the hot high concentration manganese nitrate solution is substantially the same as the prior art lower concentration solution at room temperature.

What is claimed is:
1. A process for the production of a solid electrolytic capacitor comprising oxidizing a porous tantalum anode, dipping the oxidized anode in the aqueous solution of manganese nitrate having a specific gravity greater than 1.70 and maintained at a temperature of at least 50° C., removing the anode from the manganese nitrate solution and heating at a temperature between 250° and 400° C. to convert the manganese nitrate to manganese oxide, repeating the dipping in the hot concentrated manganese nitrate solution and then heating the anode at between 250° ad 400° C. at least several times, and thereafter reoxidizing the anode.
2. The process as in claim 1 in which the anode is re-oxidized in an electrolytic solution other than a manganese nitrate solution, and then redipped in the manganese nitrate solution and heated to convert this manganese nitrate to oxide.
3. The process as in claim 1 in which the manganese nitrate sloution has a specific gravity of from 1.75 to 1.80 and is maintained at a temperature of between 50° and 60° C.
4. A solid electrolytic capacitor comprising in combination a sintered porous body formed of sintered particles of an anodizable metal; a genetic dielectric film formed on the exposed surfaces of said particles; reducible semi-conductive manganese oxide disposed in the pores of said porous body on the dielectric film, said manganese nitrate being the reduction product of converted in situ manganese nitrate impregnated into said porous body from a solution of manganese nitrate having a specific gravity greater than 1.70 and maintained at a temperature of at least 50° C.; and an electrically conductive coating on the semi-conductive oxide layer.
5. The article of claim 4 in which the anodizable metal is tantalum.

References Cited by the Examiner
UNITED STATES PATENTS

| | | |
|---|---|---|
| 3,100,329 | 8/1963 | Sherman. |
| 3,123,894 | 3/1964 | Von Bonin. |
| 3,174,209 | 3/1965 | Millard _____ 317—230 |

JOHN W. HUCKERT, *Primary Examiner.*

J. D. KALLAM, *Assistant Examiner.*